（12）United States Patent
Sann et al.

(10) Patent No.: US 9,044,695 B2
(45) Date of Patent: Jun. 2, 2015

(54) FILTER DEVICE AND FILTER ELEMENT FOR USE WITH SUCH A FILTER DEVICE

(75) Inventors: Norbert Sann, Riegelsberg (DE); Volker Backes, Marpingen (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 231 days.

(21) Appl. No.: 13/261,273

(22) PCT Filed: Sep. 14, 2010

(86) PCT No.: PCT/EP2010/005630
§ 371 (c)(1),
(2), (4) Date: May 16, 2012

(87) PCT Pub. No.: WO2011/047754
PCT Pub. Date: Apr. 28, 2011

(65) Prior Publication Data
US 2012/0223006 A1    Sep. 6, 2012

(30) Foreign Application Priority Data
Oct. 24, 2009 (DE) .......................... 10 2009 050 587

(51) Int. Cl.
*B01D 29/21* (2006.01)
*B01D 35/30* (2006.01)
*B01D 35/06* (2006.01)
*B01D 35/147* (2006.01)
*B01D 29/58* (2006.01)

(52) U.S. Cl.
CPC .............. *B01D 29/21* (2013.01); *B01D 35/306* (2013.01); *B01D 2201/298* (2013.01); *B01D 29/58* (2013.01); *B01D 35/147* (2013.01); *B01D 35/06* (2013.01); *B01D 2201/295* (2013.01); *B01D 2201/296* (2013.01); *B01D 2201/313* (2013.01); *B01D 2201/4046* (2013.01)

(58) Field of Classification Search
CPC .. B01D 29/0002; B01D 35/30; B01D 35/306; B01D 2201/291; B01D 2201/296; B01D 2201/313; B01D 2201/4046; B01D 2201/4053; B01D 2201/4061; B01D 2201/52
See application file for complete search history.

(56) References Cited

U.S. PATENT DOCUMENTS 2,360,020 A * 10/1944 Kasten et al. ................. 210/440
4,299,699 A    11/1981 Boogay
(Continued)

FOREIGN PATENT DOCUMENTS

DE    102005045012    4/2007
DE    102006034943    1/2008
(Continued)

Primary Examiner — Benjamin Kurtz
(74) Attorney, Agent, or Firm — Roylance, Abrams, Berdo & Goodman LLP

(57) ABSTRACT

A filter device has a filter housing (1) receiving a filter element (11) defining a longitudinal axis and being in the form of a filter cartridge. An end cap (19) forms an enclosure for the relevant end rim of the filter material (23, 25). The end cap fixes the position of the filter element (11) in its functional position by being on an element receiver (13) that interacts with the bottom part (7) of the filter housing (1). The element receiver (13) and the assigned end cap (19) of the filter element (11), on their parts (17 and 15) coming into engagement with one another in the functional position of the filter element are provided with shaped irregularities matched to one another to enable the engagement in a positional relationship directed towards one another.

9 Claims, 2 Drawing Sheets

(56) References Cited

U.S. PATENT DOCUMENTS

| | | | |
|---|---|---|---|
| 4,629,558 A * | 12/1986 | Garritty | 210/130 |
| 6,884,349 B1 | 4/2005 | Jiang | |
| 8,337,582 B2 * | 12/2012 | Feisthauer et al. | 55/418 |
| 2004/0035097 A1 * | 2/2004 | Schlensker et al. | 55/498 |
| 2006/0054547 A1 | 3/2006 | Richmond et al. | |
| 2009/0134087 A1 | 5/2009 | Hawkins et al. | |
| 2010/0025317 A1 | 2/2010 | Fall et al. | |
| 2010/0064646 A1 * | 3/2010 | Smith et al. | 55/501 |
| 2012/0205300 A1 * | 8/2012 | Piva et al. | 210/133 |

FOREIGN PATENT DOCUMENTS

| | | |
|---|---|---|
| WO | 0180967 | 11/2001 |
| WO | 02062447 | 8/2002 |

* cited by examiner

FILTER DEVICE AND FILTER ELEMENT FOR USE WITH SUCH A FILTER DEVICE

FIELD OF THE INVENTION

The invention relates to a filter device having at least one filter housing receiving at least one filter element defining a longitudinal axis and being in the form of a filter cartridge. On at least one end of the filter cartridge, an end cap forms an enclosure for the pertinent end edge of the filter material and can be fixed on an element receiver interacting with the bottom part of the filter housing for fixing the position of the filter element in its functional position. The invention also relates to a filter element for this filter device.

BACKGROUND OF THE INVENTION

Filter devices of this type are readily available commercially in different versions. To a large extent, these filter devices are used for filtering working fluids, such as hydraulic fluids, fuels, lubricants, and the like. In fluid systems, specifically hydraulic systems in which filter devices are used, the operational reliability of the system depends largely on the reliable operation of the filter devices located in the system. In other words, in addition to the failure of the pertinent system, a failure of the filter device can lead to serious damage to the system, and thus, can cause significant economic loss.

DE 10 2005 045 012 A1 discloses a generic filter device with a housing for holding a filter element of at least two housing parts detachably connected to one another, a support tube, and a filter material surrounding the support tube. The ends of the support tube and filter material discharge into at least one receiving part. The filter material can be withdrawn in one direction to separate it from the support tube. In this withdrawal direction, both the support tube and also equally the filter material are provided with a definable conicity. As a result of the conicity, the fouled filter material can be easily withdrawn from the support tube. The support tube can be reused with a newly inserted filter material together with its receiver parts. The receiver parts for the filter material form end caps. The transition between the filter material and the support formed in this way is seamless due to the end caps. The end caps can be molded on in the form of an upper receiver part and a lower receiver part. The ends of the support tube are held in independent receiver parts. Viewed in the longitudinal direction of the housing, the filter material with its receiver parts is made axially longer than the inner support tube.

SUMMARY OF THE INVENTION

An object of the invention is to provide a filter device characterized by special operational reliability.

According to the invention, this object is basically achieved by a filter device where, on the element receiver on the bottom part of the filter housing and on the part of the end cap of the filter element assigned to the element receiver, irregularities of shape are provided. The irregularities of shape on the element receiver and on the end cap are matched to one another such that when they are aligned to one another they enable mutual engagement. In this way, a pertinent filter element can be moved into the functional position only upon complementary features of shape on the element receiver and end cap being matched to one another such that they allow the engagement with a corresponding mutual alignment. This arrangement ensures that the filter device can be operated solely with a filter element that is intended for a respective special use and that meets the specifications ensuring operational reliability for this purpose and applying to it.

Thus, not only is a filter element precluded from be used that has an unsuitable filter fineness or that is unsuitable for the respective application, i.e., is not assigned to a corresponding pressure stage, but the risk is also avoided that possibly a so-called "discount element" available on the market will be used that does not meet the applicable safety standards.

Advantageously, the element receiver has a tube socket that projects from its top and that extends into an inner filter cavity of the filter element in the functional position to form a fluid connection. The tube socket has, as the irregularity of shape pertinent to the element receiver, an outside contour diverging from the circular. The contour can be an asymmetrical shape.

Especially advantageously, the end cap of the filter element has a connector extending into an inner filter cavity of the filter element. The cavity is surrounded by a fluid-permeable support tube and is engaged by the tube socket of the element receiver in the functional position of the filter element. Since the irregularity of shape is on the end cap, the opening cross section of the connector is matched to the non-circular outside contour of the tube socket of the element receiver.

Especially advantageously, the tube socket on its outside contour has a side surface tapering it toward its free end in the manner of a conical surface. Processes of changing the filter elements become especially simple and convenient because the conical shape of the tube socket on the element receiver facilitates engagement with the connector of the filter element to be inserted.

With respect to the shapes of the contours matched to one another, the outside contour of the tube socket and the opening cross section of the connector each can have one segment in the form of a graduated circle concentric to the longitudinal axis and a corrugated segment nearer relative to the longitudinal axis.

Since to enable the mutual engagement between the end cap and element receiver a given positional relationship is necessary in which the irregularities of shape assume positions that are aligned to one another, the additional advantage arises that the engagement forms a locking element. Even in the case of a tangential flow that may occur in the filter housing, the filter element is then secured against a possible torque around the longitudinal axis.

The defined rotary position of the filter element in the filter housing moreover allows the further advantageous possibility of providing a shielding part on the end cap in a filter housing having a lateral fluid inlet adjacent to the end cap of the filter element in the functional position. This shielding part extends along the outside of the filter material of the filter element and, in the functional position of the filter element, overlaps the region of the fluid inlet as impact protection. The fixed rotary position ensures that the impact protection is located in the incident flow region of the filter element. Advantageously, on the side of the end cap opposite the shielding part, a capture magnet can be provided and protected against direct incident flow since it is located in the lee region.

The subject matter of the invention is also a filter element for use with this filter device.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
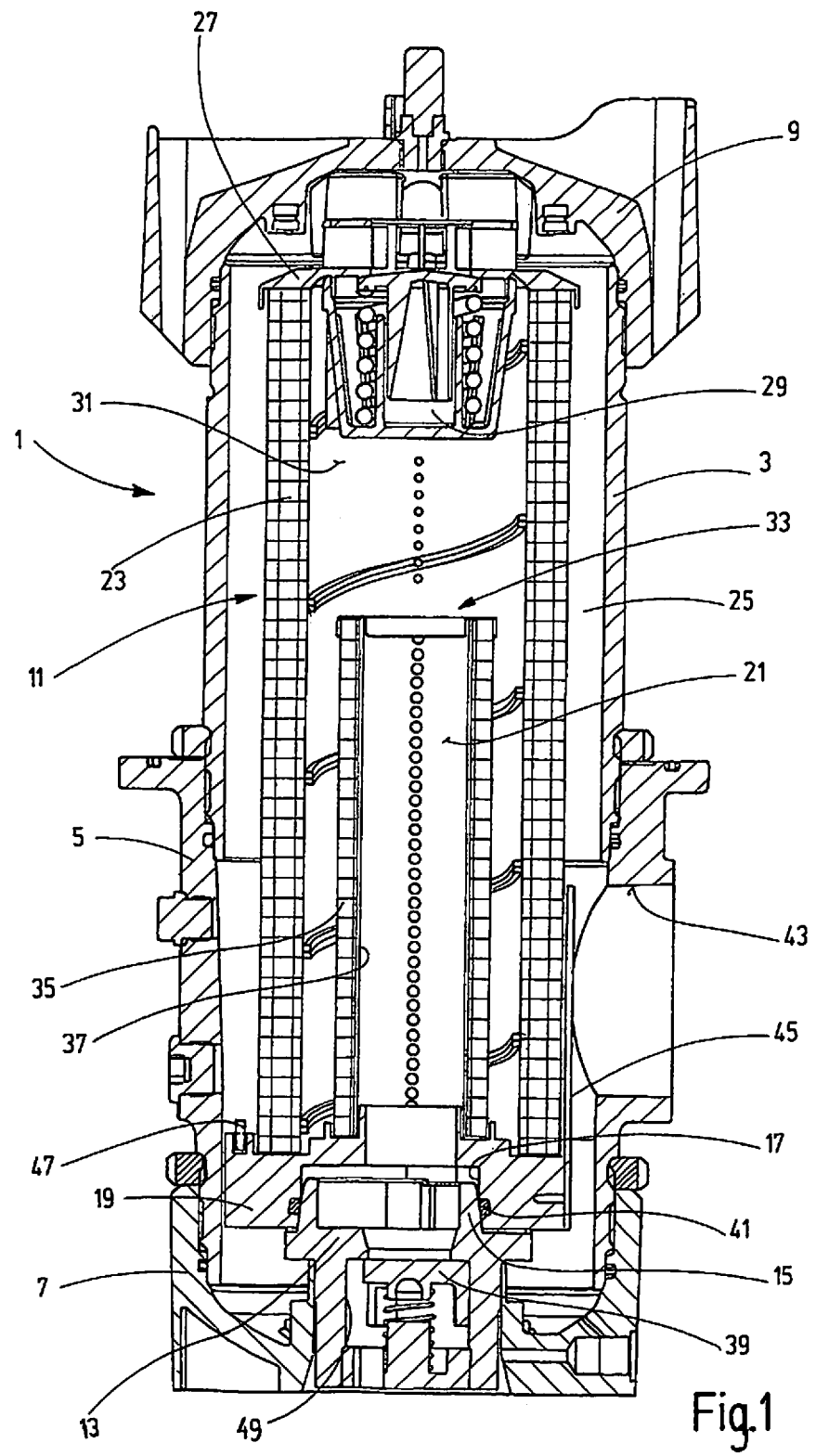
FIG. 1 is a side elevational view in section of a filter device according to an exemplary embodiment of the invention, where a filter element is in a state suitable for use in the filter housing in the functional position.

A hollow cylindrical filter housing 1 has a top part 3, a middle part 5, and a bottom part 7 screwed or threadedly engaged to one another. In particular, the middle part 5 and the bottom part 7 can also be made in one piece. The upper end of the top part 3 opposite the bottom part 7 can be sealed by a screw-on housing cover 9. The housing 1 can accommodate a filter element 11 coaxially to the longitudinal axis of the housing 1. For positioning and fixing filter element 11 in position on the bottom part 7, an element receiver 13 is provided in the form of a hollow body, shown separately in FIG. 2. On the element receiver top facing the filter element 11, a specially shaped tube socket 15 is provided. For the actual positioning of the filter element 11, this tube socket 15 interacts with a connector 17 located on the end cap 19 of the filter element 11 facing the bottom part 7. The connector 17 forms a fluid connection to an inner filter cavity 21 within the filter element 11, which filter cavity forms the output side in the filtration process.

In FIG. 1, the filter element 11 is made as a two-stage element, where a filter material 23 of coarser filter fineness extending on the outside of the filter element 11. On the outside, filter material 23 borders the outer housing space 25 forming the inlet side in the filtration process and forming a prefilter. The lower edge of the filter material 23 is enclosed on the bottom side by the end cap 19. The top end of the filter material 23 is enclosed by an upper cover cap 27 on which a bypass valve arrangement 29 is provided and enables throughflow from the space 25 to the prefiltration space 31 on the inside of the filter material 23 at a given, inlet-side pressure level. When the filter element 11 is made in two stages, the prefiltration space 31 is not directly connected to the connector 17 of the end cap 19. Connected upstream of the connector 17, a fine filter unit 33 with a filter material 35 of greater filter fineness surrounds a fluid-permeable support tube 37 open to the connector 17 of the end cap 19. Together with the lower edge of the filter material 35, support tube 37 is enclosed on the outside of the connector 17 by the end cap 19. Thus, the space 21 forming the outlet side in the filtration process is connected via the connector 17 to the tube socket 15 of the element receiver 13. From the bottom of element receiver 13, the cleaned fluid can emerge via a spring-loaded bottom valve 39. On the inside of the connector 17 provided for engagement of the tube socket 15, a seal arrangement with an O-ring 41 creates the seal between the connector 17 and the outside of the tube socket 15 in the functional position.

In the exemplary embodiment shown in FIG. 1, the fluid inlet 43 to the inlet-side space 25 on the middle part 5 of the housing is located in the vicinity of the end cap 19 of the filter element 11 located in the functional position. As impact protection, on the outside of the end cap 19 in the peripheral region of the filter element 11 facing the inlet 43, a shield plate 45 is mounted and extends arched along the outside of the outer filter material 23 in the pertinent peripheral area. In the lee region opposite the fluid inlet 43, facing away from the incident flow region a flow-damped dirt capture basket is formed with a capture magnet 47.

As already stated, the irregularities of shape on the parts of the element receiver 13 and the bottom side end cap 19 of the filter element 11, which parts interact in the functional position, ensure that only a proper filter element 11 can be moved into the functional position and that in the functional position a rotary position of the filter element 11 is dictated. In that position, the filter element 11 is held locked, the shielding plate 45 is ensured to be located as impact protection in the incident flow region, and the capture magnet 47 is located in the lee region.

Figure 2:
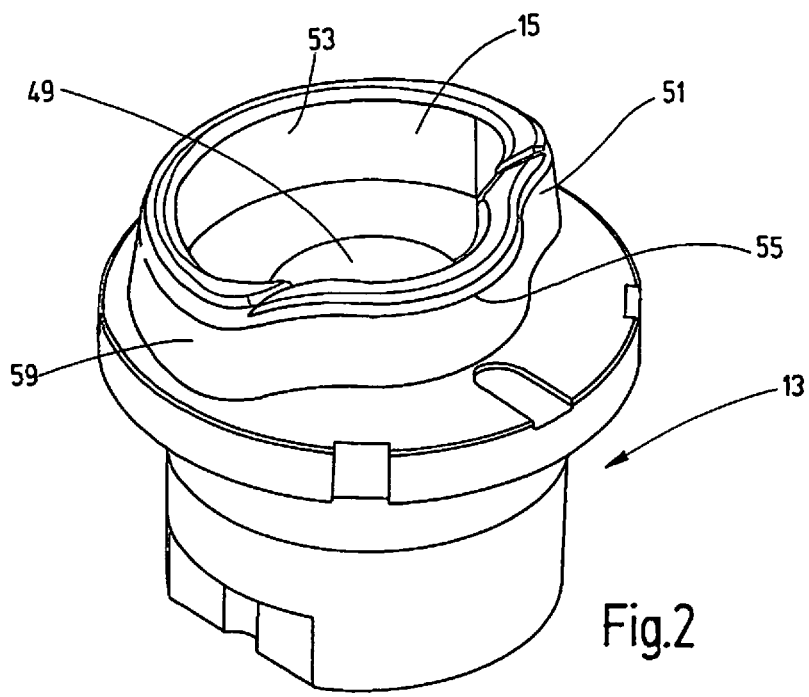
FIG. 2 is a perspective view of the element receiver of FIG. 1 shown separately and drawn on a larger scale than in FIG. 1.
Figure 3:
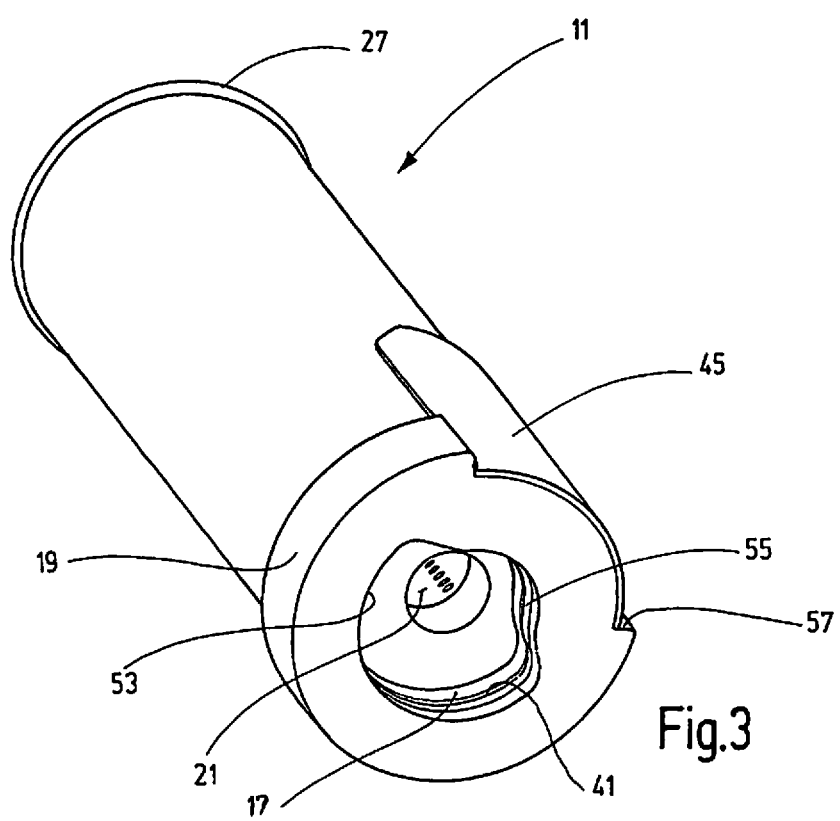
FIG. 3 is a perspective view of the filter element, shown reduced in size compared to FIG. 2 and compared to a practical embodiment, looking at the end cap of the filter device of FIG. 1.

FIGS. 2 and 3 show that for this purpose the tube socket 15 of the element receiver 13 that surrounds the inner passage 49 of the element receiver 13, which passage leads to the bottom valve 39, has a shape that diverges from the circular. Specifically, the outside contour 51 of that shape is made asymmetrical. As FIG. 2 shows best, this contour has a segment 53 in the form of the arc of a graduated circle concentric to the longitudinal axis and has a segment 55 on the element receiver 13 placed radially further inward and having a corrugated shape. Complementary thereto, as FIG. 3 shows, the opening cross section of the connector 17 has the shape that fits the element receiver with the arc-shaped segment 53 and the corrugated segment 55, i.e., an appropriate shape for which the O-ring 41 or another formed seal on the connector 17 provides a seal around the entire periphery on the outside contour of the tube socket 15 in the functional position. As FIG. 3 shows, the shielding plate 45 that forms the impact protection on the end cap 19 is mounted in a peripheral edge depression 57, for example, by cementing the plate 45, optionally made of a plastic material, into the depression 57 of the end cap 19 likewise made of plastic.

As FIGS. 1 and 2 show, the tube socket 15 is slightly conically tapered toward its free end because the side surface 59 is slightly tilted to the longitudinal axis. When the filter element is changed, moving connector 17 and tube socket 15 together is made easy and convenient without the risk of damaging the O-ring 41.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
at least one filter housing having an element receiver interacting with a bottom part of said filter housing; and
at least one filter element defining a longitudinal axis and being received in said filter housing, said filter element being in a form of a filter cartridge with filter material and having an end cap forming an enclosure for an end edge of said filter material, said element receiver and said end cap having parts engaging one another in a functional position of said filter element in said filter housing, said parts having shape irregularities matched to one another and engaging in a single aligned positional relationship only, said shape irregularities deviating outside contours of said element receiver and said end cap from a circular shape, said outside contours having asymmetrical shapes, said element receiver including a tube socket projecting from a top thereof and extending into an inner filter cavity of said filter element to form a fluid connection in the functional position, said tube socket having said shape irregularity of said element receiver providing said outside contour thereof deviating from the circular shape, said end cap including a connector extending into said inner cavity of said filter element, said inner cavity being surrounded by a fluid-permeable support tube, said connector being engaged by said tube socket in the functional position of said filter element and having an opening cross section with said shape irregularity of said end cap matched to said outside contour of said tube socket, said outside contour of said tube socket and said opening cross section of said connector each including one segment in a graduated circle concentric to said longitudinal axis and a corrugated segment closer to said longitudinal axis than the respective graduated circle.

2. A filter device according to claim 1 wherein
said tube socket has a side surface on said outside contour thereof tapering toward a free end thereof forming a conical surface.

3. A filter device according to claim 1 wherein
said filter housing comprises a fluid inlet adjacent to said end cap of said filter element located in the functional position; and
said end cap comprises a shielding part extending on an outside of and only partially about a circumference of said filter material of said filter element and overlapping a region of said fluid inlet to provide impact protection.

4. A filter device according to claim 3 wherein
a capture magnet is on a side of said end cap opposite said shielding part.

5. A filter device according to claim 1 wherein
each said surface irregularity of said parts extends axially relative to said longitudinal axis on said end cap and is entirely within a right circular cylindrical surface defined by the respective graduated circle.

6. A filter element, comprising:
a filter material defining a longitudinal axis and being in a form of a filter cartridge; and
an end cap forming an enclosure for an end edge of said filter material, said end cap having an end cap part for engaging a mating part of an element receiver in a filter housing in a functional position of the filter element in the filter housing, said end cap part having a shape irregularity matched to a shape irregularity of the element retainer engaging in a single aligned positional relationship only, said shape irregularity deviating an outside contour of said end cap from a circular shape, said outside contour having an asymmetrical shape, said end cap including a connector extending into an inner cavity of said filter medium, said inner cavity being surrounded by a fluid-permeable support tube, said connector having an opening cross section with said shape irregularity of said end cap, said outside contour of said opening cross section of said connector including one segment in a graduated circle concentric to said longitudinal axis and a corrugated segment closer to said longitudinal axis than the respective graduated circle.

7. A filter element according to claim 6 wherein
said end cap comprises a shielding part extending on an outside of and only partially about a circumference of said filter material.

8. A filter element according to claim 7 wherein
a capture magnet is on a side of said end cap opposite said shielding part.

9. A filter element according to claim 6 wherein
each said surface irregularity of said parts extends axially relative to said longitudinal axis on said end cap and is entirely within a right circular cylindrical surface defined by the respective graduated circle.

\* \* \* \* \*